United States Patent
Lai et al.

(10) Patent No.: US 11,520,183 B2
(45) Date of Patent: Dec. 6, 2022

(54) TOUCH FRONT LIGHT MODULE AND TOUCH DISPLAY DEVICE

(71) Applicant: TPK Touch Solutions (Xiamen) Inc., Fujian (CN)

(72) Inventors: Sheh Jung Lai, Taichung (TW); Kuo Hsin Wang, Nantou County (TW); Ming Chuan Lin, Taichung (TW); Yu Ling Chen, Taichung (TW)

(73) Assignee: TPK Touch Solutions (Xiamen) Inc., Fujian (CN)

( * ) Notice: Subject to any disclaimer, the term of this patent is extended or adjusted under 35 U.S.C. 154(b) by 0 days.

(21) Appl. No.: 17/136,076

(22) Filed: Dec. 29, 2020

(65) Prior Publication Data

US 2022/0206343 A1 Jun. 30, 2022

(51) Int. Cl.
| | |
|---|---|
| *G02F 1/1333* | (2006.01) |
| *G02F 1/16753* | (2019.01) |
| *G06F 3/044* | (2006.01) |
| *G02F 1/1335* | (2006.01) |
| *G02B 1/14* | (2015.01) |
| *F21V 8/00* | (2006.01) |
| *G02F 1/167* | (2019.01) |

(52) U.S. Cl.
CPC ......... *G02F 1/133616* (2021.01); *G02B 1/14* (2015.01); *G02B 6/0043* (2013.01); *G02F 1/13338* (2013.01); *G02F 1/16753* (2019.01); *G06F 3/0446* (2019.05); *G02F 1/167* (2013.01)

(58) Field of Classification Search
CPC ........... G02F 1/133616; G02F 1/16753; G02F 1/13338; G02F 1/167; G02B 1/14; G02B 6/0043; G06F 3/0446
See application file for complete search history.

(56) References Cited

U.S. PATENT DOCUMENTS

| | | | | |
|---|---|---|---|---|
| 7,613,375 | B2 * | 11/2009 | Shimizu ................ | G06F 3/0421 385/129 |
| 8,913,035 | B2 * | 12/2014 | Lai ......................... | G02B 6/001 345/175 |
| 8,963,886 | B2 * | 2/2015 | Wassvik .................. | G06F 3/042 345/175 |
| 10,884,553 | B2 * | 1/2021 | Weilbacher ............ | G02B 6/102 |

(Continued)

FOREIGN PATENT DOCUMENTS

| | | | | |
|---|---|---|---|---|
| CN | 201927005 | U * | 8/2011 | |
| CN | 112396958 | A * | 2/2021 | ............ G09F 9/301 |

(Continued)

*Primary Examiner* — Ricardo Osorio
(74) *Attorney, Agent, or Firm* — Cooper Legal Group, LLC

(57) ABSTRACT

A touch front light module includes a touch light-guiding unit, a light-emitting unit, and a protective layer. The touch light-guiding unit includes a glass board, a touch layer disposed on a top surface of the glass board, and a microstructure layer disposed on a bottom surface of the glass board and which has a plurality of microstructures for light scattering. The light-emitting unit is disposed on a lateral side of the touch light-guiding unit and is configured to emit light to be incident on the lateral surface of the glass board. The protective layer is disposed on the touch layer. A touch display device including a display module and the touch front light module disposed on the display module is also disclosed.

20 Claims, 4 Drawing Sheets

(56) References Cited

U.S. PATENT DOCUMENTS

| | | | | |
|---|---|---|---|---|
| 2011/0221705 A1* | 9/2011 | Yi | ............ | G06F 3/0425 |
| | | | | 345/175 |
| 2011/0234537 A1* | 9/2011 | Kim | ............ | G06F 3/0421 |
| | | | | 345/175 |
| 2012/0086673 A1* | 4/2012 | Chien | ............ | G06F 3/0428 |
| | | | | 345/175 |
| 2012/0249438 A1* | 10/2012 | Kim | ............ | G06F 3/0412 |
| | | | | 345/173 |
| 2014/0192006 A1* | 7/2014 | Rathnam | ............ | G02B 6/0038 |
| | | | | 345/174 |
| 2015/0070327 A1* | 3/2015 | Hsieh | ............ | G06F 3/0421 |
| | | | | 345/175 |
| 2015/0277110 A1* | 10/2015 | Oh | ............ | B32B 27/36 |
| | | | | 359/513 |
| 2018/0074360 A1* | 3/2018 | Miyazaki | ............ | G02F 1/133308 |
| 2019/0165429 A1* | 5/2019 | Lu | ............ | H01M 4/382 |
| 2020/0050010 A1* | 2/2020 | Zheng | ............ | G02F 1/133504 |
| 2020/0050033 A1* | 2/2020 | Galwaduge | ............ | G02F 1/1677 |
| 2020/0409207 A1* | 12/2020 | Shen | ............ | G02B 6/0085 |

FOREIGN PATENT DOCUMENTS

| | | | | |
|---|---|---|---|---|
| TW | 201835654 | * | 10/2018 | |
| TW | 201835654 A | | 10/2018 | |
| TW | M602721 U | | 10/2020 | |
| WO | WO-2020078117 A1 * | | 4/2020 | ............ G06F 3/0412 |
| WO | WO-2020124482 A1 * | | 6/2020 | |

\* cited by examiner

TOUCH FRONT LIGHT MODULE AND TOUCH DISPLAY DEVICE

BACKGROUND

Field of Disclosure

The disclosure relates to a touch module, and more particularly to a touch front light module and a touch display device including the touch front light module.

Description of Related Art

A reflective display device is generally illuminated by reflecting ambient light to save power, and hence is suitable for applications in various portable display devices such as an electronic book reader device. Although the display function of the reflective display device is achieved using ambient light, a front light module is required to maintain the display function under a low-light environment or inadequate lighting.

Portable display devices are usually provided with a touch feature for intuitive operations. Referring to FIG. 1, a conventional reflective display device 9 with a touch feature includes a display module 91, a light-guiding plate 92, a light-emitting diode (LED) light source 93, a touch module 94, and a protective glass board 95, in which an optical adhesive layer 96 is used for adherence between each of the display module 91, the light-guiding plate 92, the touch module 94, and the protective glass board 95. The LED light source 93 is disposed on a lateral side of the light-guiding plate 92, so that the light emitted therefrom is incident on the lateral side of the light-guiding plate 92. Since the optical adhesive layer 96 is required for adherence between the display module 91 and the light-guiding plate 92, between the light-guiding plate 92 and the touch module 94, and between the touch module 94 and the protective glass board 95, the resulting multi-layered adhering structure not only increases the manufacturing cost but also complicates the production process. Besides, the light-guiding plate 92 has a thick appearance as it is mainly made of a plastic material using injection-molding. With the addition of the touch module 94 and the protective glass board 95, the conventional reflective display device 9 fails to fulfill the requirements for portable display devices (i.e., thin and lightweight).

SUMMARY

Therefore, an object of the disclosure is to provide a touch front light module and a touch display device that can alleviate at least one of the drawbacks of the prior art.

According to an aspect of this disclosure, the touch front light module includes a touch light-guiding unit, a light-emitting unit, and a protective layer. The touch light-guiding unit includes a glass board, a touch layer, and a microstructure layer. The glass board has a top surface and a bottom surface that are opposite to each other and a lateral surface that is connected to the top surface and the bottom surface. The touch layer is disposed on the top surface of the glass board. The microstructure layer is disposed on the bottom surface of the glass board and has a plurality of microstructures that are configured for light scattering. The light-emitting unit is disposed on a lateral side of the touch light-guiding unit and is configured to emit light to be incident on the lateral surface of the glass board. The protective layer covers the touch layer.

According to another aspect of the disclosure, the touch display device includes a display module and the above-mentioned touch front light module which is disposed on the display module.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
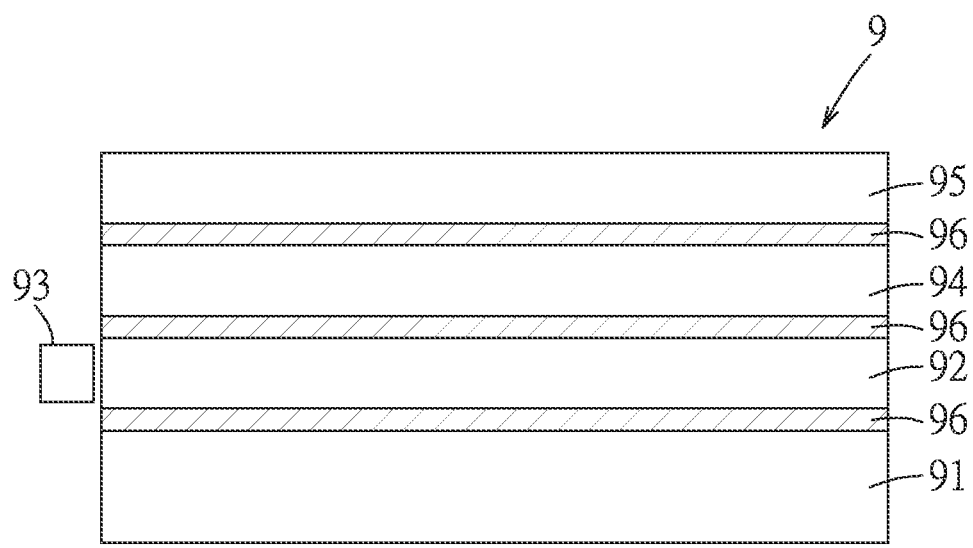
FIG. 1 is a schematic sectional view illustrating a conventional reflective display module with a touch feature.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
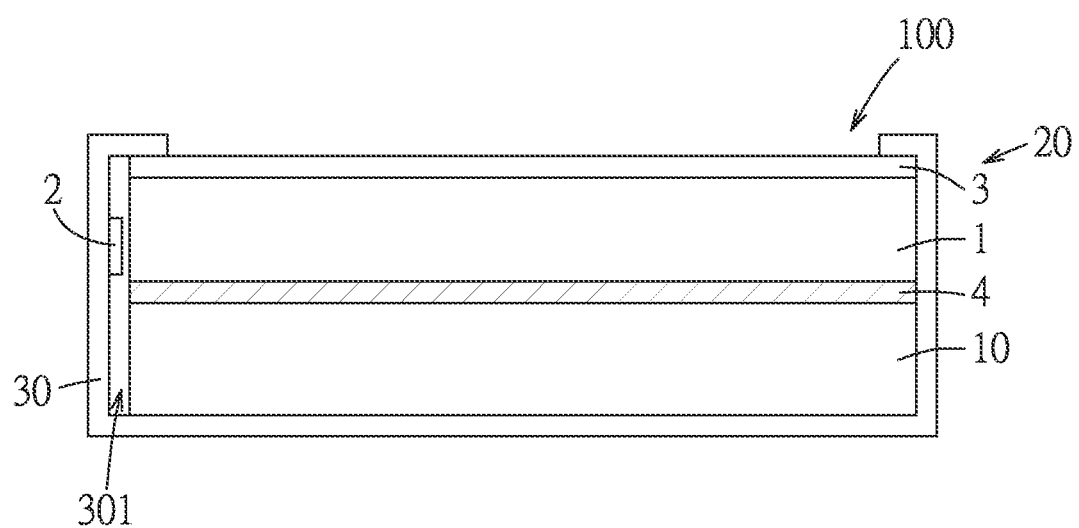
FIG. 2 is a schematic sectional view illustrating an embodiment of a touch display device according to this disclosure.
Figure 3:
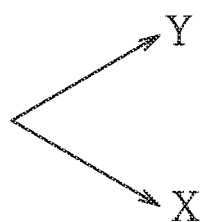
FIG. 3 is a schematic top view illustrating a touch light-guiding unit including a touch layer of the embodiment.
Figure 3:
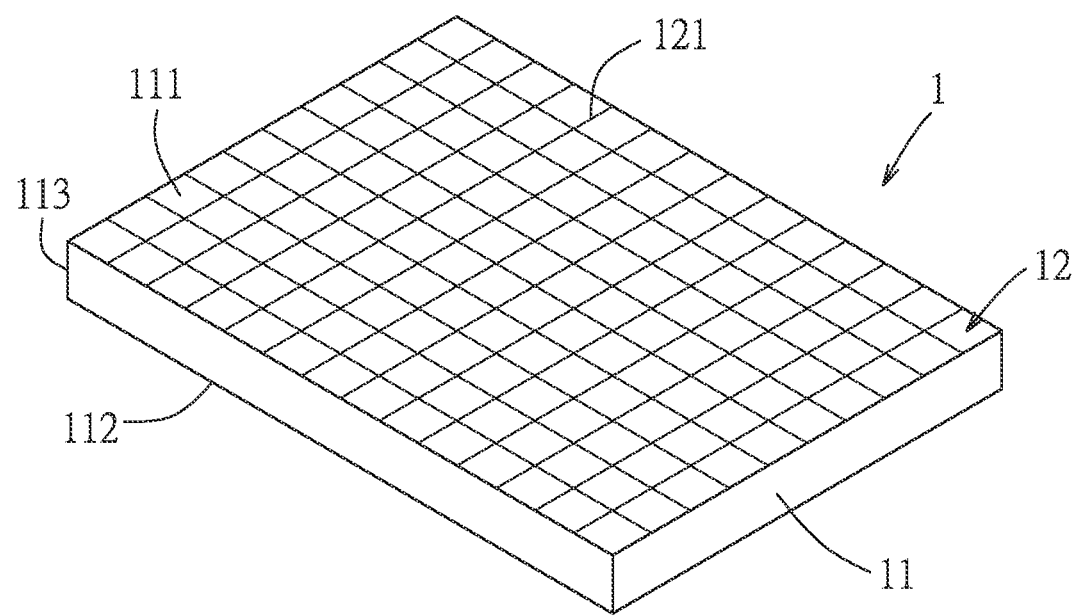
Figure 4:
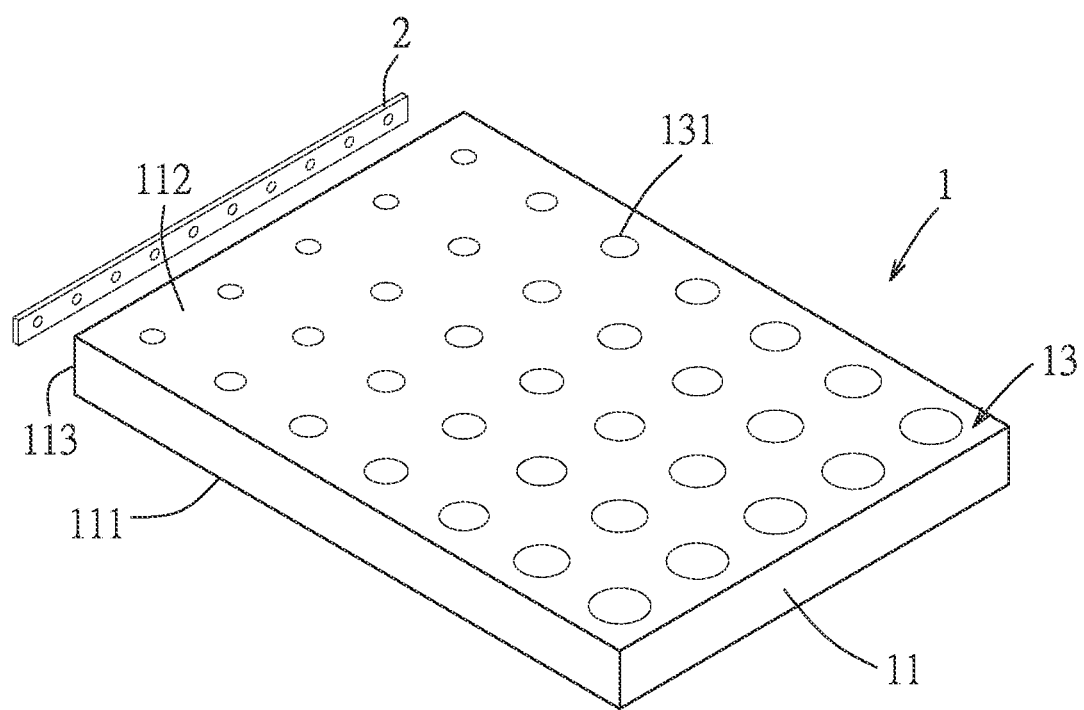
FIG. 4 is a schematic bottom view illustrating the touch light-guiding unit including a microstructure layer of the embodiment.

Referring to FIGS. 2 to 4, an embodiment of a touch display device 100 includes a display module 10 and a touch front light module 20 that is disposed on the display module 10. In this embodiment, the display module 10 is an electrophoretic display module. In other embodiments, the display module 10 may be a liquid crystal display module, but the display module 10 is not limited thereto.

The touch front light module 20 includes a touch light-guiding unit 1, a light-emitting unit 2, and a protective layer 3. In this embodiment, the touch front light module 20 not only provides the functions of light-guiding and touch control, but the touch front light module 20 also provides protection for the display module 10 and serves as a component in the touch display device 100 which is closest to a user and which is adapted for being touched and operated by the user.

The touch light-guiding unit 1 includes a glass board 11, a touch layer 12, and a microstructure layer 13. The touch light-guiding unit 1 may have a thickness that is within a range of 0.3 mm to 3 mm. The glass board 11 has a top surface 111 and a bottom surface 112 that are opposite to each other, and the glass board 11 has a lateral surface 113 that is connected to the top surface 111 and the bottom surface 112. The top surface 111 is a surface that is relatively close to the user. The glass board 11 serves as a protective cover, and examples of a suitable material for making the same may include, but are not limited to, an aluminosilicate glass material and a soda glass material. In certain embodiments, to increase the strength of the glass board 11 and to thereby allow the same to have an improved resistance to deformation and scrape abrasion (i.e., for obtaining a tempered glass), the glass board 11 may be subjected to a chemical strengthening process, in which the glass board 11 is immersed in a bath including potassium nitrate at a high temperature, so as to replace sodium ions in the glass board 11 with potassium ions of the potassium nitrate so as to achieve a desired strengthening effect.

The touch layer 12 is formed on the top surface 111 of the glass board 11. In certain embodiments, the touch layer 12 employs projected capacitive technology. Specifically, the touch layer 12 may include a plurality of conductive electrodes 121 formed by, for example, a photolithography process which includes exposure to light, developing procedures, and etching procedures. Besides, the touch layer 12 may be designed to have a single-layer electrode structure, a bridge single-layer electrode structure, or a double-layered electrode structure that is disposed on the top surface 111 of the glass board 11. For convenience of description, two axes (such as X-axis and Y-axis) conductive electrodes 121 illustrated in FIG. 3 are mutually isolated and perpendicularly disposed on the top surface 111. These two axes conductive electrodes 121 are shown only for demonstrative purpose. In addition, the touch layer 12 may include a transparent conductive material. Examples of the transparent conductive material may include, but are not limited to, nanometal, indium tin oxide (ITO), indium zinc oxide (IZO), antimony tin oxide (ATO), antimony zinc oxide (AZO), carbon nanotubes, graphene, and other suitable transparent conductive materials.

The microstructure layer 13 is formed on the bottom surface 112 and includes a plurality of microstructures 131 that are configured for light scattering. In certain embodiments, the microstructures 131 are optical dots (diffusion dots) formed using a print ink. In other embodiments, the microstructures 131 may be formed by laser processing, a coating process, etc., and the shape of the microstructures 131 is not limited to a circle shape.

In addition, as shown in FIG. 4, the light-emitting unit 2 may be disposed on a lateral side of the touch light-guiding unit 1, such as on the lateral surface 113 of the glass board 11, and hence the light-emitting unit 2 is configured to emit light to be incident on the lateral surface 113 of the glass board 11. In certain embodiments, the light-emitting unit 2 may be an LED light, but the light-emitting unit 2 is not limited thereto. Other light sources suitable for display devices that are well known in the art may also be used herein. Regarding the distribution of the optical dots, a projection area of each of the optical dots on the bottom surface 112 may decrease along with a decrease in the distance between the optical dots and the light-emitting unit 2. In other words, each of the microstructures 131 that are disposed proximal to the lateral surface 113 (on which the light-emitting unit 2 is disposed) has a projection area on the bottom surface 112 which is smaller than a projection area of each of the microstructures 131 that are disposed distal from the lateral surface 113 on the bottom surface 112. As a result, in a unit area of the bottom surface 112, the microstructures 131 that are disposed proximal to the lateral surface 113 have a total projection area on the bottom surface 112 which is smaller than a total projection area of the microstructures 131 that are disposed distal from the lateral surface 113 on the bottom surface 112, so as to provide a uniform surface light source.

According to this disclosure, in practice, the touch layer 12 is first formed on the top surface 111 of the glass board 11 to construct a one-glass solution (OGS) touch panel and a one side solution touch panel. With such structural design, the microstructure layer 13 then can be further formed on the bottom surface 112 of the glass board 11, so as to impart light-guiding function to the touch panels.

The protective layer 3 covers the touch layer 12, so as to provide an improved surface strength and a planarization effect. In certain embodiments, the protective layer 3 is a hard coating layer which directly contacts the touch layer 12. The protective layer 3 may have a thickness that is within a range of 0.05 mm to 1 mm. The hard coating layer may be made of a material that includes, but is not limited to, polyacrylate, epoxy resin, polyurethane, polysilane, silicone, and poly(silicon-acrylic). Besides, the protective layer 3 may be further added with an additional agent, such as a cross-linking agent, a polymerization inhibitor, a stabilizer (e.g., an antioxidant, an ultraviolet (UV) stabilizer, etc.), a surfactant or analogs thereof, or combinations thereof, so as to enhance the optical and protection effects.

The touch display device 100 may further include an optical adhesive layer 4 to adhere the touch front light module 20 to the display module 10. More specifically, the microstructure layer 13 of the touch front light module 20 adheres to the display module 10. In addition, as shown in FIG. 2, the touch display device 100 may further include a frame 30 which has an accommodation space 301. The touch front light module 20 and the display module 10 are received in the accommodation space 301. The touch front light module 20 is partially exposed from the frame 30. That is, the touch front light module 20 provides a surface for the user to view images displayed on the display module 10 and to conduct touch control thereon.

In sum, with the design of the touch light-guiding unit 1, the touch front light module 20 of this disclosure is provided with the functions of light-guiding, touch control, and protection. In comparison to the conventional multi-layered adhering structure including the protective glass board 95, the light-guiding plate 92, and the touch module 94 adhered to one another through the optical adhesive layers 96, the touch front light module 20 of this disclosure has a reduced thickness and weight and a simplified structure, and thus can be manufactured in a more efficient and effective manner.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number, and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A touch display device, comprising:
 a display module;
 a touch front light module disposed on the display module, wherein the touch front light module comprises:
 a touch light-guiding unit comprising:

a glass board having a top surface, a bottom surface and a lateral surface, wherein the top surface and the bottom surface are opposite to each other, and the lateral surface is connected to the top surface and the bottom surface;

a touch layer disposed on the top surface; and a microstructure layer disposed on the bottom surface and having a plurality of microstructures configured for light scattering;

a light-emitting unit disposed on a lateral side of the touch light-guiding unit and configured to emit light to be incident on the lateral surface of the glass board; and a protective layer disposed on the touch layer, wherein the protective layer is a hard coating layer and directly contacts the touch layer; and a frame, wherein the frame directly contacts a second lateral surface of the glass board and is spaced apart from the lateral surface of the glass board.

2. The touch display device according to claim 1, wherein the protective layer has a thickness that is within a range of 0.05 mm to 1 mm.

3. The touch display device according to claim 1, wherein the touch light-guiding unit has a thickness that is within a range of 0.3 mm to 3 mm.

4. The touch display device according to claim 1, wherein the microstructures are optical dots.

5. The touch display device according to claim 1, wherein each of the microstructures that are disposed proximal to the lateral surface has a projection area on the bottom surface which is smaller than a projection area of each of the microstructures that are disposed distal from the lateral surface on the bottom surface.

6. The touch display device according to claim 5, wherein in a unit area of the bottom surface, the microstructures that are disposed proximal to the lateral surface have a total projection area on the bottom surface which is smaller than a total projection area of the microstructures that are disposed distal from the lateral surface on the bottom surface.

7. The touch display device according to claim 1, further comprising an optical adhesive layer, wherein the touch front light module is adhered to the display module through the optical adhesive layer.

8. The touch display device according to claim 1, wherein the frame has an accommodation space, and the touch front light module and the display module are disposed in the accommodation space.

9. The touch display device according to claim 1, wherein the frame directly contacts a top surface of the protective layer.

10. The touch display device according to claim 9, wherein the frame directly contacts a lateral surface of the display module and a bottom surface of the display module.

11. A touch front light module, comprising:

a touch light-guiding unit comprising:

a glass board having a top surface, a bottom surface and a lateral surface, wherein the top surface and the bottom surface are opposite to each other, and the lateral surface is connected to the top surface and the bottom surface;

a touch layer disposed on the top surface; and a microstructure layer disposed on the bottom surface and having a plurality of microstructures configured for light scattering, wherein each of the microstructures that are disposed proximal to the lateral surface has a projection area on the bottom surface which is smaller than a projection area of each of the microstructures that are disposed distal from the lateral surface on the bottom surface;

a light-emitting unit disposed on a lateral side of the touch light-guiding unit and configured to emit light to be incident on the lateral surface of the glass board; and a protective layer disposed on the touch layer.

12. The touch front light module according to claim 11, wherein in a unit area of the bottom surface, the microstructures that are disposed proximal to the lateral surface have a total projection area on the bottom surface which is smaller than a total projection area of the microstructures that are disposed distal from the lateral surface on the bottom surface.

13. A touch display device, comprising:

a display module;

a touch front light module of claim 11 disposed on the display module; and a frame, wherein the frame directly contacts a second lateral surface of the glass board and is spaced apart from the lateral surface of the glass board.

14. The touch display device according to claim 13, wherein the frame directly contacts a top surface of the protective layer.

15. A touch display device, comprising:

a display module;

a touch front light module disposed on the display module, wherein the touch front light module comprises:

a touch light-guiding unit comprising:

a glass board having a top surface, a bottom surface and a lateral surface, wherein the top surface and the bottom surface are opposite to each other, and the lateral surface is connected to the top surface and the bottom surface;

a touch layer disposed on the top surface; and a microstructure layer disposed on the bottom surface and having a plurality of microstructures configured for light scattering;

a light-emitting unit disposed on a lateral side of the touch light-guiding unit and configured to emit light to be incident on the lateral surface of the glass board; and a protective layer disposed on the touch layer, wherein the protective layer is a hard coating layer and directly contacts the touch layer; and a frame directly contacting the touch light-guiding unit and a top surface of the protective layer.

16. The touch display device according to claim 15, wherein the protective layer has a thickness that is within a range of 0.05 mm to 1 mm.

17. The touch display device according to claim 15, wherein the touch light-guiding unit has a thickness that is within a range of 0.3 mm to 3 mm.

18. The touch display device according to claim 15, wherein the microstructures are optical dots.

19. The touch display device according to claim 15, wherein each of the microstructures that are disposed proximal to the lateral surface has a projection area on the bottom surface which is smaller than a projection area of each of the microstructures that are disposed distal from the lateral surface on the bottom surface.

20. The touch display device according to claim 19, wherein in a unit area of the bottom surface, the microstructures that are disposed proximal to the lateral surface have a total projection area on the bottom surface which is smaller than a total projection area of the microstructures that are disposed distal from the lateral surface on the bottom surface.

\* \* \* \* \*